US006318751B1

(12) United States Patent
Slagerman

(10) Patent No.: US 6,318,751 B1
(45) Date of Patent: Nov. 20, 2001

(54) ANGLED AXLE BRACKET FOR A WHEELCHAIR

(75) Inventor: Murray G. Slagerman, Lafayette, CO (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/332,823

(22) Filed: Jun. 14, 1999

(51) Int. Cl.[7] ................................ B62B 1/00; B62M 1/14
(52) U.S. Cl. ........................................ 280/647; 280/250.1
(58) Field of Search ................................ 280/250.1, 647, 280/304.1, 490.1

(56) References Cited

U.S. PATENT DOCUMENTS 4,360,213 * 11/1982 Rudwick et al. ................. 280/250.1
4,650,201 3/1987 Hartwell .
4,679,816 * 7/1987 Riikonen .............................. 280/650
4,721,321 1/1988 Haury et al. .
4,730,842 3/1988 Summers et al. .
4,852,899 * 8/1989 Kueschall .......................... 280/250.1
5,060,962 10/1991 McWethy .
5,152,543 10/1992 Sims et al. .
5,267,745 12/1993 Robertson et al. .
5,360,224 * 11/1994 Geiger et al. ..................... 280/250.1
5,590,893 1/1997 Robinson et al. .
6,079,725 * 6/2000 Lazaros ............................ 280/250.1

OTHER PUBLICATIONS

Sunrise Medical "Quickie TNT" brochure—10/97 update.
Invacare Deutschland GmbH "Action 2000 LT" brochure dated Aug. 1997.
Invacare Deutschland GmbH "Action 2000 LT EURO" brochure dated Aug. 1997.
Sopur Medizintechnik GmbH "Classic 120" brochure dated Oct. 1997.
Sopur Medizintechnik GmbH "Classic 140" brochure dated Oct. 1997.

* cited by examiner

*Primary Examiner*—Robert P. Olszewski
*Assistant Examiner*—Andrew J. Fischer
(74) *Attorney, Agent, or Firm*—MacMillan, Sobanski & Todd, LLC

(57) ABSTRACT

A bracket, suitable for being mounted for movement along an elongated wheelchair frame member, has a frame coupling capable of being attached to the elongated frame member. The bracket has an extension extending away from the frame coupling, the extension having an orifice for receiving a wheelchair axle. The orifice is spaced apart from the frame coupling in a direction longitudinally along the wheelchair frame member.

14 Claims, 7 Drawing Sheets

ANGLED AXLE BRACKET FOR A WHEELCHAIR

RELATED APPLICATIONS

The present invention is related to the inventions of the following U.S. patent applications: Ser. No. 09/333,085, entitled NOTCHED AXLE BRACKET SUPPORT FOR A WHEELCHAIR, filed on the same date at the present application; and Design application Ser. No. 29,106,3352, now issued as U.S. Pat No. Des. 423,993, entiled A REAR WHEEL MOUNTING CLAMP FOR A WHEELCHAIR, filed on the same date at the present application.

TECHNICAL FIELD

This invention relates in general to wheelchairs, and more specifically to wheelchairs having drive wheels mounted for rotation. More particularly, this invention relates to mechanisms for mounting wheelchair drive wheel axles to wheelchair frames.

BACKGROUND OF THE INVENTION

Wheelchairs are well known forms of transportation that increase the mobility of the physically impaired. Wheelchairs are typically relatively small, single-person conveyances that generally comprise a seat supported by a frame which, in turn, is supported by two opposed drive wheels and two front casters.

The wheelchair occupant's center of gravity is generally positioned close to the drive wheels to permit the wheelchair occupant to maneuver the wheelchair with greater ease. The wheelchair occupant's center of gravity may be shifted in a number of ways. The drive wheels may be cambered so that the distance between the drive wheels at ground level is greater than the distance between the drive wheels at the seat. In addition to cambering the drive wheels, adjusting the position of the drive wheels relative to the wheelchair frame may also shift the wheelchair occupant's center of gravity. For example, the drive wheels may be moved forward or backward, or may be raised or lowered, relative to the wheelchair frame to shift the wheelchair occupant's center of gravity.

Adjusting the wheelchair seat relative to the wheelchair frame may also shift the center of gravity of the wheelchair occupant. In addition to shifting the center of gravity of the wheelchair occupant, adjusting the wheelchair seat may improve the orientation of the arms and hands of the wheelchair occupant relative to the drive wheels. Improving the orientation of the arms and hands of the wheelchair occupant relative to the drive wheels enables the occupant of the wheelchair to propel the wheelchair with greater comfort and increased efficiency. Adjusting the wheelchair seat to an optimal position also reduces the risk of tissue trauma suffered by the wheelchair occupant by reducing the constant pressure between the wheelchair occupant's skin and the wheelchair, and particularly, the wheelchair seat.

Adjusting the position of the drive wheels relative to the wheelchair frame can be accomplished in several ways. Typically, the drive wheels are mounted for rotation on an axle, with the axle being insertable into an axle tube that is mounted on the wheelchair frame. Adjustment between the relative positions of the drive wheels and the wheelchair frame can be accomplished by moving the axle tube relative to the frame. Another means of adjusting the position of the drive wheels relative to the wheelchair frame is to move the portions of the frame housing the axle tube relative to the remainder of the wheelchair frame. It is known to have an axle bracket that can be mounted to a frame member in either a forward or rearward direction to provide longitudinal adjustability of the axle with respect to the frame.

It would be advantageous if there could be developed a simplified assembly for enabling easy adjustment of the position of wheelchair drive wheels with respect to the wheelchair frame. Such a mechanism should be easy to assemble and disassemble for rapid adjustment of the wheelchair drive wheels, and should provide a wide margin of adjustment. Further, the mechanism should be simple in construction for long service life, easy installation and low manufacturing cost.

SUMMARY OF THE INVENTION

The above objects as well as other objects not specifically enumerated are achieved by a bracket suitable for being mounted for movement along an elongated wheelchair frame member, the bracket having a frame coupling capable of being attached to the elongated frame member, and the bracket having an extension extending away from the frame coupling, the extension having an orifice for receiving a wheelchair axle, the orifice being spaced apart from the frame coupling in a direction longitudinally along the wheelchair frame member.

In another embodiment of the invention, a bracket is mounted for movement along a generally horizontal elongated wheelchair frame member, the bracket having a frame coupling attached to the elongated frame member and sized to fit around the elongated frame member, and the bracket having an extension extending away from the frame coupling, the extension having an orifice for receiving a wheelchair axle, the orifice being spaced apart from the frame coupling in a direction longitudinally along the wheelchair frame member.

In yet another embodiment of the invention, a wheelchair comprises side frames for supporting a seat, the side frames including an elongated frame member, drive wheels and caster wheels on which the side frames are mounted, and a bracket mounted for movement along the elongated wheelchair frame member, the bracket having a frame coupling attached to the elongated frame member, and the bracket having an extension extending away from the frame coupling, and the extension having an orifice for receiving a wheelchair axle. The orifice is spaced apart from the frame coupling in a direction longitudinally along the wheelchair frame member.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

Figure 1:
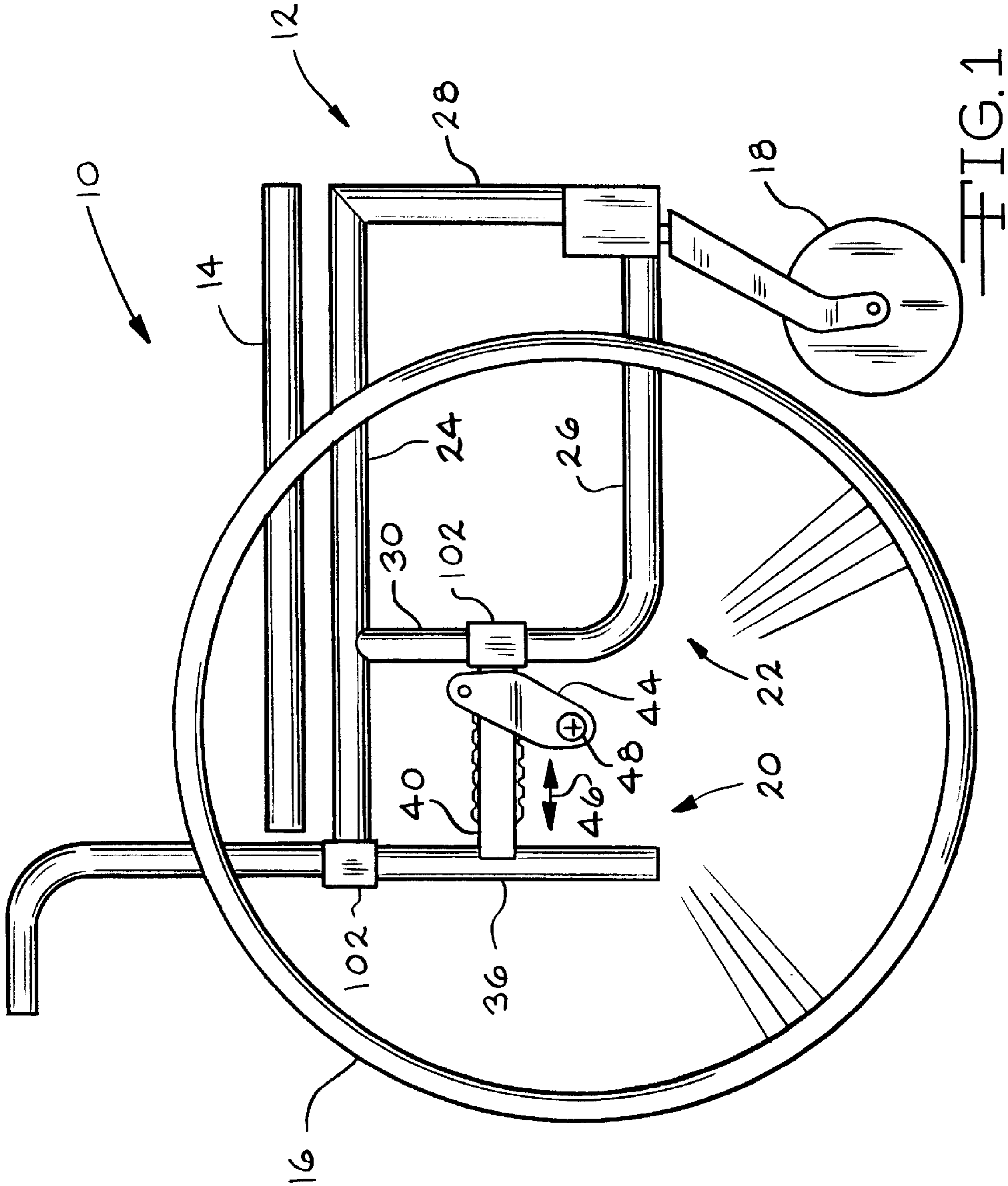
FIG. 1 is a schematic view in elevation of a wheelchair including the axle bracket of the invention.

As shown in FIG. 1, the wheelchair is indicated generally at 10. The wheelchair is generally comprised of a pair of side frames 12, a seat 14 supported by the side frames, a rear drive wheel 16 and a front caster wheel 18. The side frames 12 are typically comprised of light weight tubular members joined together by fasteners or by welding. As shown, the side frame 12 is comprised of two portions, a rear side frame assembly 20 and a front side frame assembly 22. The front side frame assembly 22 includes a generally horizontal upper side rail 24 and a generally horizontal lower side rail 26. These are connected together by forward vertical strut 28 and rear vertical strut 30. It is to be understood that the front side frame assembly can be configured in many different styles and still perform the function of providing support for the wheelchair seat 14 and the wheelchair user.

The rear side frame assembly 20 is comprised of a generally vertical rear member 36 and a generally horizontal elongated frame member 40. The vertical rear member 36 can be provided with an upwardly extending seat back frame to support a seat back, not shown. An axle mounting bracket 44 is slidably mounted onto the elongated frame member 40 so that the axle mounting bracket can be moved longitudinally along the elongated frame member 40 into various positions, as indicated by directional arrows 46. The axle mounting bracket 44 includes an axle orifice 48 for receiving the drive wheel axle or axle sleeve, neither of which are shown in FIG. 1. It can be seen that moving the axle mounting bracket 44 longitudinally along the elongated frame member 40 enables the drive wheel to be positioned forwardly or rearwardly in several different positions. This ability to position the drive wheel forwardly or rearwardly with respect to the elongated frame member 44, and hence with respect to the entire side frame 12, offers the wheelchair user a great deal of flexibility in moving the center of gravity of the wheelchair forward and rearward. This flexibility is advantageous because it allows the wheelchair user to change the relative position of the drive wheel with respect to the user's arms and hands. Also, the ability to change the center of gravity alters the share of the weight applied to each of the four wheels, and this enables the wheelchair user to modify the dynamic motion characteristics of the wheelchair. For example, moving the center of gravity rearward reduces the weight applied to the front caster wheels 18, thereby changing the maneuverability character of the wheelchair.

Figure 2:
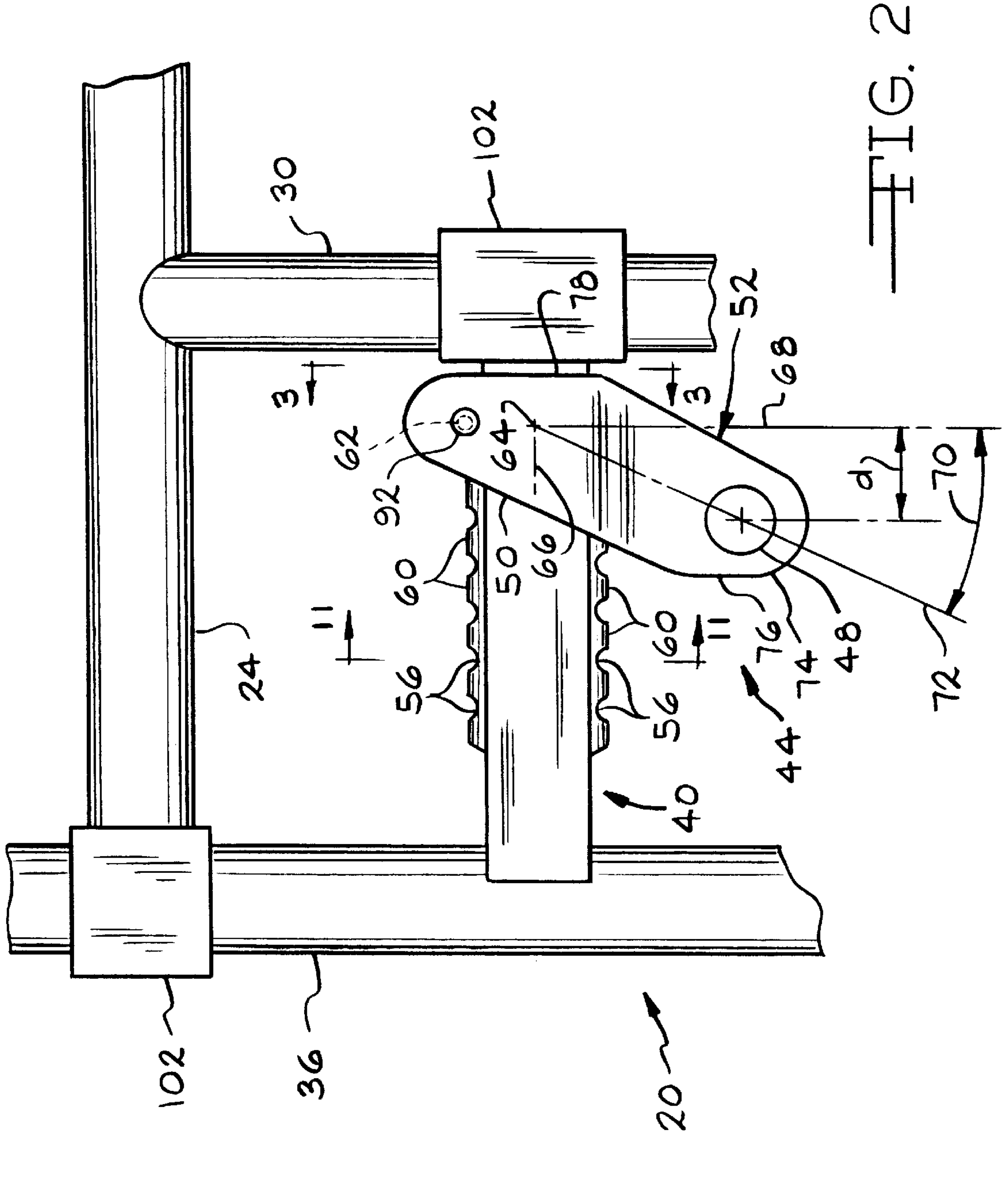
FIG. 2 is an enlarged schematic view in elevation of a portion of the wheelchair, showing the axle bracket of the invention.
Figure 3:
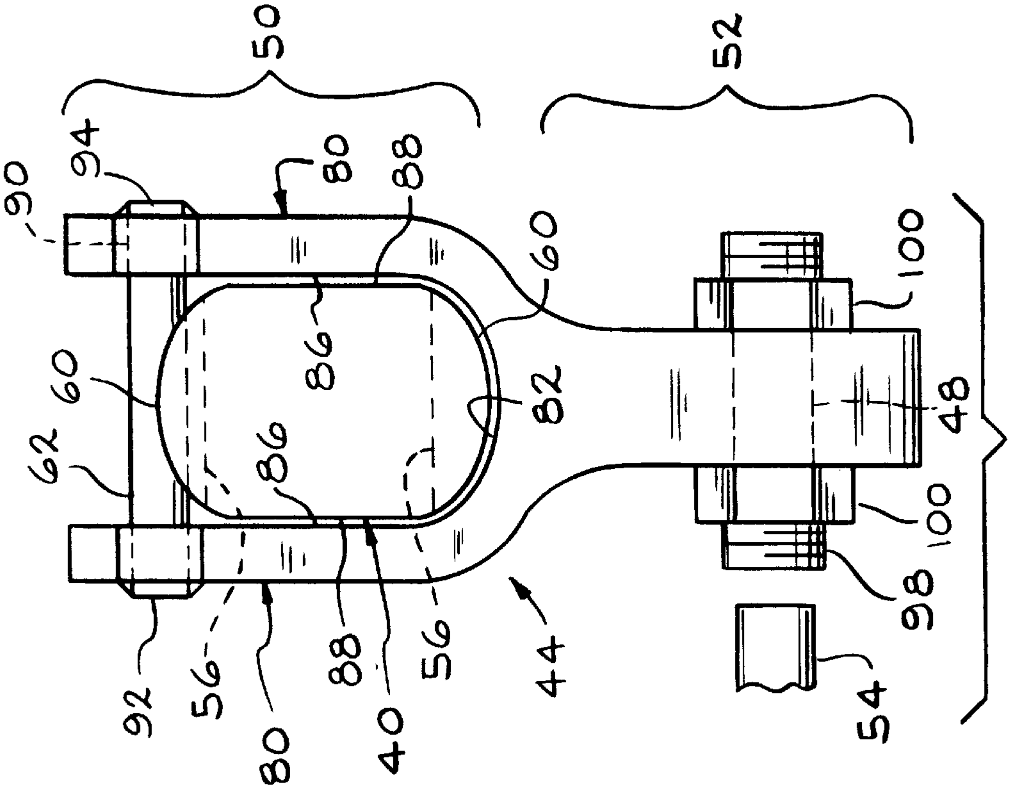
FIG. 3 is a schematic elevational view of the axle bracket, and a cross-sectional view of the elongated frame member, taken along line 3—3 of FIG. 2.

As shown in FIGS. 2 and 3, the axle bracket is generally comprised of a frame coupling 50, which is attached to the elongated frame member 40, and an axle bracket extension 52 extending away from the frame coupling 50. The extension 52 extends downwardly and rearwardly, as shown in FIG. 2, but other orientations are possible. The axle orifice 48 for mounting the wheelchair axle 54 is positioned in the axle extension 52, and therefore the extension enables the axle to be vertically spaced apart from the elongated frame member 40.

Figure 11:
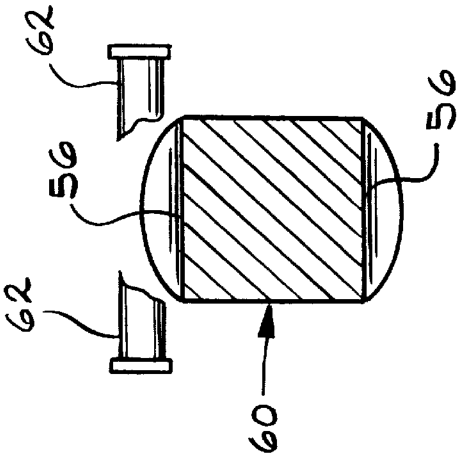
FIG. 11 is a schematic cross-sectional view in elevation of the elongated frame member taken along line 11—11 in FIG. 2, partially showing the pin.

The elongated frame member 40 has built into its top surface and bottom surface a series of grooves 56, defined by lands 60. These grooves 56 extend laterally across the top and bottom surface of the elongated frame member 40. A bolt or pin 62 can be inserted through the frame coupling in a manner to laterally rest in one of the lateral grooves 56 and thereby lock the axle bracket 44 into a fixed position longitudinally with respect to the elongated frame member 40, as shown in FIGS. 3 and 11. Therefore, the axle bracket 44, which is otherwise free to slide forward and rearward, i.e., longitudinally with respect to the elongated frame member 40, becomes fixed by the insertion of the pin 62. It is to be understood that numerous other arrangements of indexing the bracket 44 can be employed. For example, a series of bores or holes could be positioned through the elongated frame member, and a pin could be inserted through a selected bore.

An approximate centerpoint 64 of the axle bracket 44 can be defined at the intersection of a horizontal line 66, vertically centered at the midpoint of the elongated frame member 40, and a vertical line 68 centered on the pin 62. It can be seen that the angle at which the bracket extension 52 extends away from the frame coupling 50 positions the axle orifice 48 slightly rearward from the bracket coupling 50. This rearward spacing of the center of the axle orifice 48 from the center point 64 can be viewed as a longitudinal offset or spacing distance d between the centerpoint 64 and the axle orifice 48. Hence, it can be seen that the axle orifice 48 is spaced apart from the frame coupling 50 in a direction longitudinally along the wheelchair frame member 40. This longitudinal offset distance d can be any amount, but is preferably within the range of from about 1 to about 10 cm, and most preferably about 2.5 cm.

The longitudinal offset d is established because the axle bracket extension 52 extends away from the frame coupling 50 at an angle 70 defined by the vertical line 68 and a line 72 connecting the centerpoint of the axle orifice 48 and the bracket centerpoint 64.

The angle 70 is preferably within the range of from about 10 to about 60 degrees. The longitudinal offset distance d enables the axle 54 to be positioned very close to any frame member, such as vertical rear member 36, that it may encounter.

To provide even closer positioning of the axle to the vertical rear member 36, the rounded distal end 74 of the axle bracket extension 44 is provided with a flat edge 76 on the side oriented away from the coupling 50, i.e., to the left as shown in FIG. 2. Likewise, the frame coupling 50 is provided with a flat edge 78 to enable the bracket 44 to be positioned as close as possible to the rear vertical strut 30.

As shown most clearly in FIG. 3, the frame coupling 50 is yoke-shaped, having two spaced apart ears 80 defining a saddle 82. The ears and saddle are configured to fit around the elongated frame member 40 so that the axle bracket can be slid along the elongated frame member for adjustment of the position of the axle. The pin 62, which acts as a connector, links the ears 80 to attach the frame coupling 50, and hence the axle bracket 44, to the elongated frame member 40. The coupling ears 80 have generally flat inner surfaces 86 to generally correspond to the generally flat sides 88 of the elongated frame member 40. The pin 62 can be inserted through yoke bores 90, and can be provided with a pin head 92 and can be secured to the yoke ears by a nut 94. Other means for attaching the pin to the yoke ears can be used.

The axle bracket extension 52 is positioned in a plane substantially midway between the coupling ears 80. A threaded axle sleeve 98 is mounted in the axle orifice 48 in the axle extension 52 for receiving the axle 54. The axle sleeve can be secured to the axle bracket extension 52 with a pair of nuts 100, or by any other suitable means. It is to be understood that numerous other axle mounting arrangements, such as a camber tube, can be used with the invention.

Figure 4:
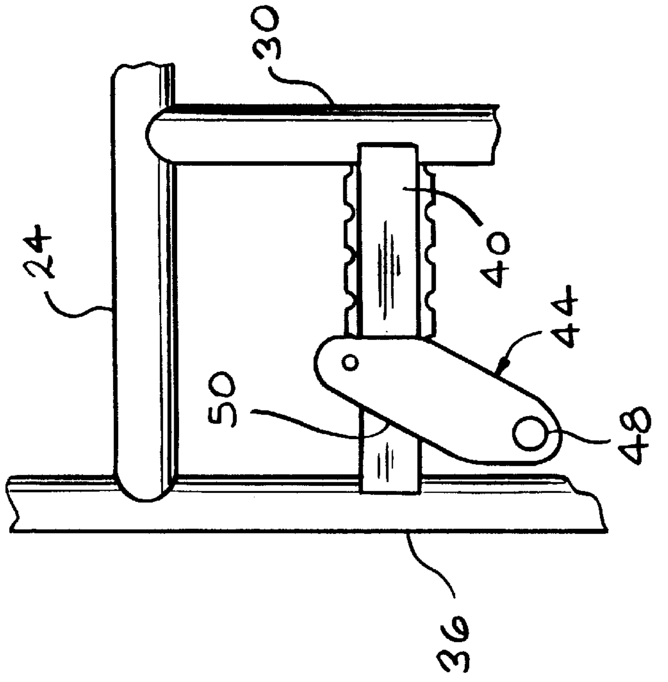
FIGS. 4–7 are schematic elevational views illustrating various arrangements of the axle bracket with respect to the elongated frame member.

One of the advantages of the axle bracket of the invention is that it can be slid or adjusted along the length of the elongated frame member 40, and can also be reversed and/or inverted for greater flexibility of positioning, as will be explained below. As shown in FIG. 4, the axle bracket 44, mounted in the orientation shown in FIGS. 1–3, can be slid or moved rearward along the elongated frame member so that the axle orifice is as close as possible to the vertical rear member 36. As shown in FIGS. 1 and 2, the rear side frame assembly 20 and the front side frame assembly are connected together by tube connectors 102 that enable the rear side frame assembly 20 to be easily disconnected from the front side frame assembly 22 as needed.

Figure 5:
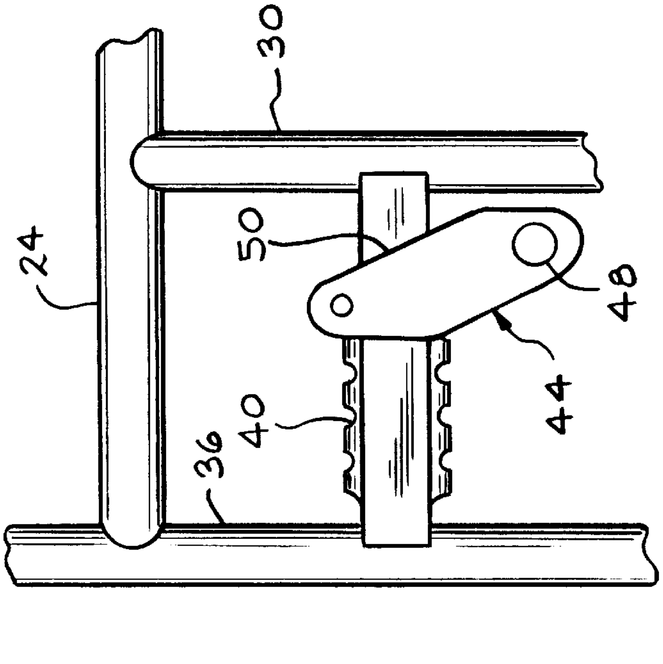

One of the advantages of the invention is that the pin 62 can be removed from the bracket to allow the bracket to be removed from the elongated frame member and replaced in a reversed orientation and/or in an inverted orientation. As shown in FIG. 5, the axle bracket 44 is installed in an orientation with the axle orifice 48 spaced longitudinally forward from the frame coupling 50. Therefore, the axle bracket is configured so that it can be attached to the elongated frame member 40 in either of two opposite longitudinal directions, thereby enabling the bracket to be mounted with the axle tube orifice positioned either spaced longitudinally in one direction or spaced longitudinally in an opposite direction with respect to the frame coupling 50.

Figure 6:
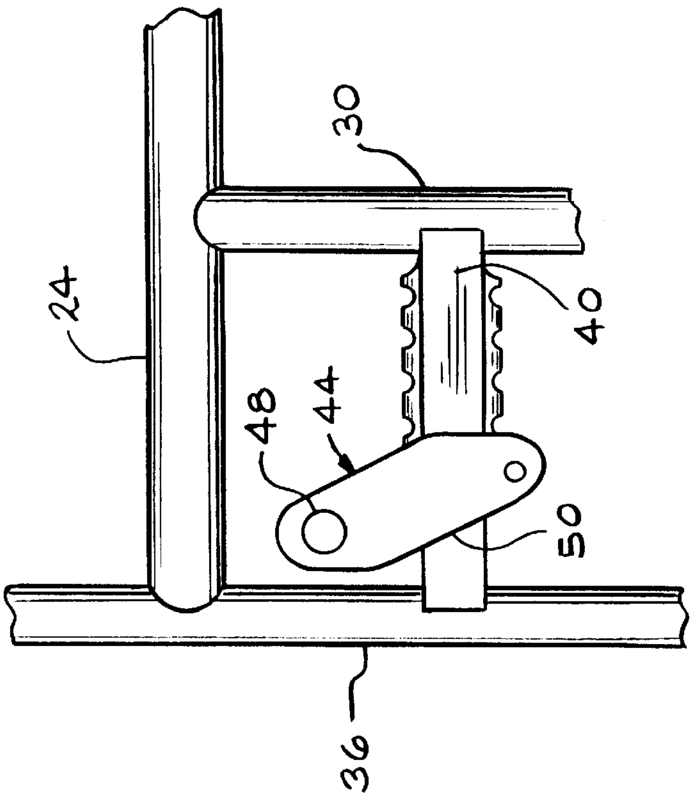
Figure 7:
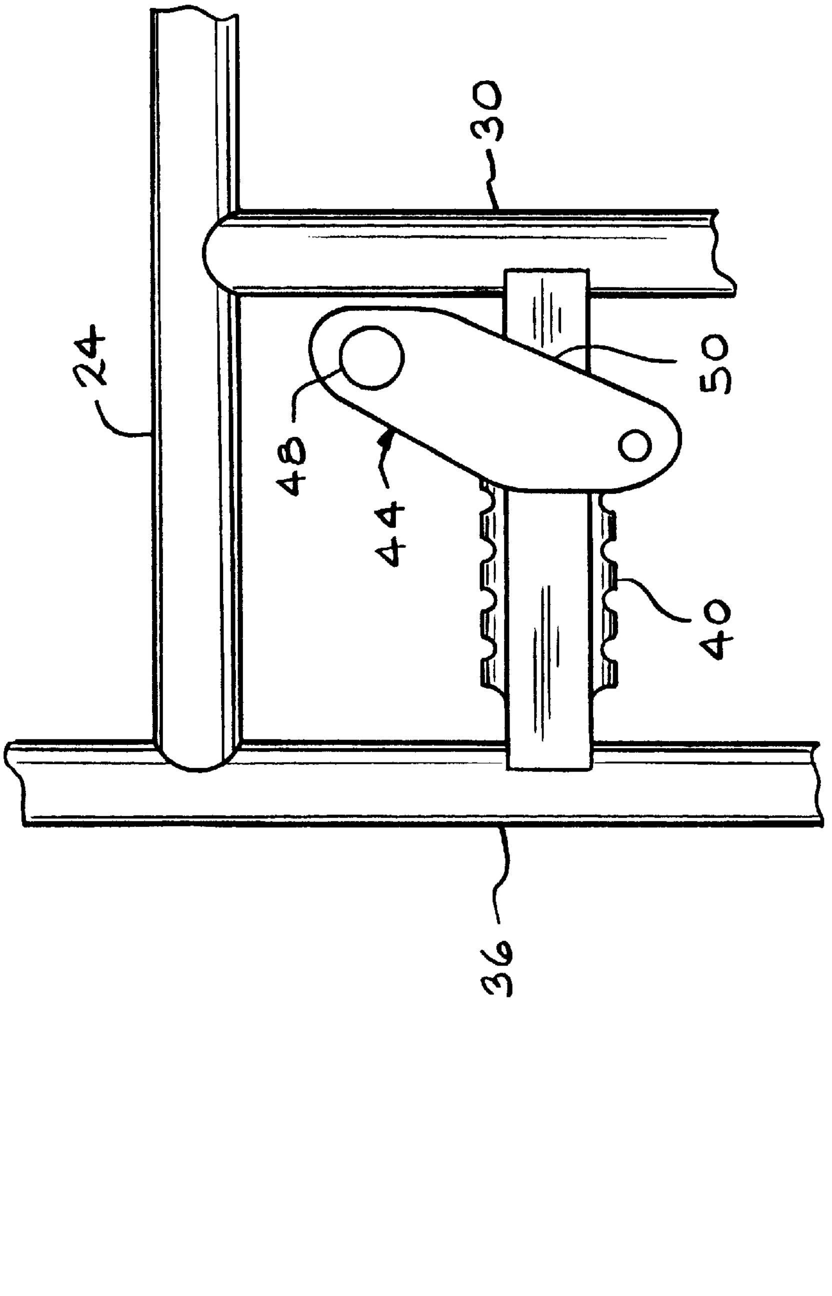

As can be seen from FIG. 3, the bracket yoke is designed and configured so that can be inverted in its position on the elongated frame member 40. Therefore, an additional range of positions for the axle orifice above the elongated frame member can be used, as shown in FIGS. 6 and 7. In FIG. 6, the axle orifice 48 is spaced apart from the axle bracket frame coupling 50 in a direction longitudinally rearward with respect to the elongated frame member 40. In FIG. 7, the axle orifice 48 is spaced apart from the axle bracket frame coupling 50 in a direction longitudinally forward with respect to the elongated frame member 40. By comparing the configuration of FIGS. 6 and 7 with the configuration of FIGS. 4 and 5, it can be seen that the bracket 44 can be attached to the elongated frame member 40 in either of two opposite orientations, i.e., up or down with respect to the elongated frame member, thereby enabling the bracket to be mounted with the axle tube orifice positioned on either one side or the other of the elongated frame member.

Figure 8:
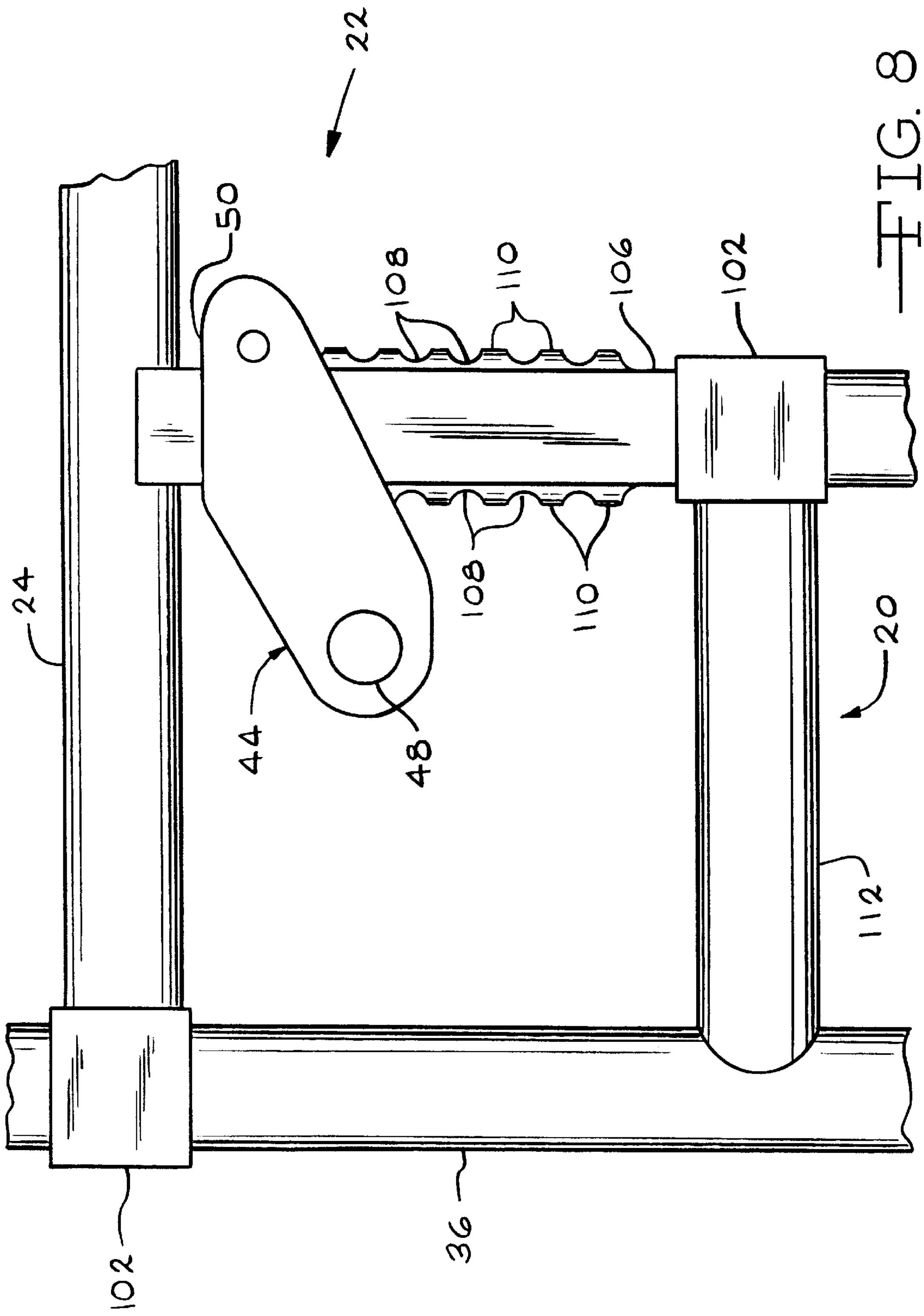
FIG. 8 is an enlarged schematic view in elevation similar to FIG. 2, illustrating an alternate embodiment of the axle bracket of the invention installed on a vertical elongated frame member.

As shown in FIG. 8, the axle bracket 44 of the invention can be mounted for vertical movement along a modified rear vertical strut 106, similar in position and function to the rear vertical strut 30 illustrated in FIGS. 1–7, but being adapted or structured with grooves 108 and lands 110 similar to the grooves 56 and lands 60 illustrated in FIGS. 1–7. A horizontal frame member 112 connects the rear vertical strut 106 with the vertical rear member 36. The bracket 44 can be removed from the rear vertical strut 106 and replaced in a reversed and/or inverted orientation or direction in a manner similar to that shown in FIGS. 4–7. Therefore, it can be seen from FIG. 8 that the orifice is spaced apart from the frame coupling in a direction longitudinally along the wheelchair frame member, when that frame member is a vertically oriented frame member 106, as well as when that frame member is a horizontally oriented frame member 40 as illustrated in FIGS. 1–7. It should be understood that the bracket 44 can be attached to the elongated frame member 40 in either of two opposite orientations, i.e., either forward or rearward with respect to the vertically oriented elongated frame member 106, thereby enabling the bracket to be mounted with the axle tube orifice positioned on either one side or the other of the elongated frame member.

Figure 9:
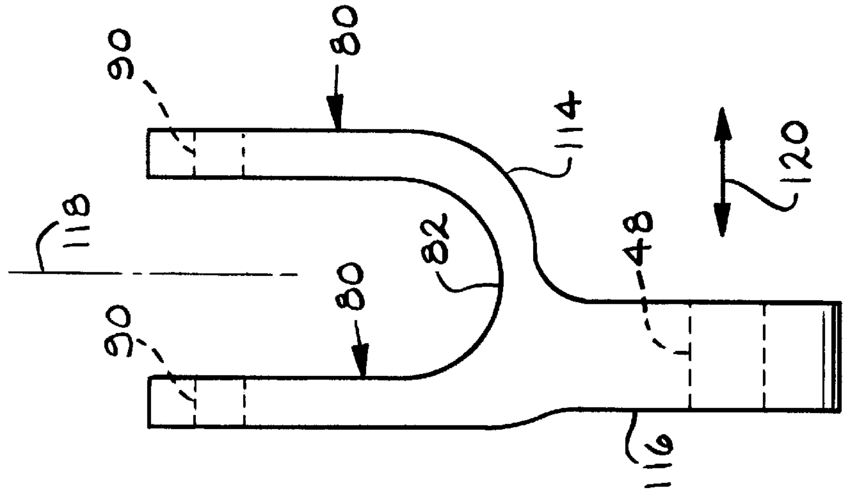
FIG. 9 is a schematic elevational view similar to FIG. 3, but showing an alternate embodiment in which the axle bracket is offset laterally for increased flexibility in positioning.

As shown in FIG. 9, in an alternate embodiment of the axle bracket 114, the extension member 116 is offset laterally from the lateral centerline 118 between the coupling ears for increased flexibility. This feature enables the bracket 114 to be reversed so that the lateral positioning of the extension member 116, and hence of the axle sleeve 98 and drive wheel 16, can be moved laterally inwardly or outwardly, as indicated by directional arrow 120. The extension 116 has an orifice 48 for receiving a wheelchair axle 54, and the orifice is spaced apart from the frame coupling 50 in a direction longitudinally along the wheelchair frame member.

Figure 10:
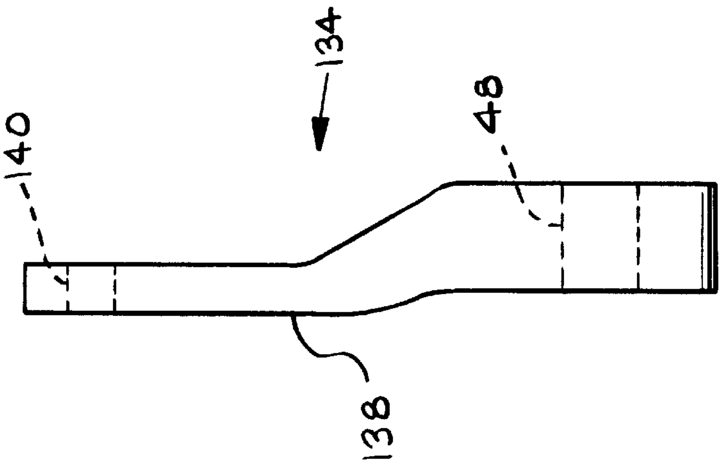
FIG. 10 is a schematic elevational view similar to FIG. 3, but showing yet another embodiment of the axle bracket, with the frame coupling comprising a single flange.

In the embodiment of the axle bracket 134 shown in FIG. 10, the frame coupling comprises a single flange 138 rather than the opposed yoke ears 80 illustrated in FIGS. 3 and 9. The flange 138 includes a bore 140 that can be used for bolting the bracket to the elongated frame member through a bore, not shown, in the elongated frame member. The extension 142 has an orifice 48 for receiving a wheelchair axle 54, and the orifice is spaced apart from the frame coupling 134 in a direction longitudinally along the wheelchair frame member.

The principle and mode of operation of this invention have been described in its preferred embodiments. However, it should be noted that this invention may be practiced otherwise than as specifically illustrated and described without departing from its scope.

What is claimed is:

1. In combination, a generally horizontal elongated wheelchair frame member and a bracket slidably mounted on the elongated wheelchair frame member, the bracket having a frame coupling attached to the elongated frame member and sized to fit around the elongated frame member, and the bracket having an extension extending away from the frame coupling, the extension having an orifice for receiving a wheelchair axle, the orifice being spaced apart from the frame coupling in a direction longitudinally along the wheelchair frame member, and the bracket being configured so that the bracket can be attached to the elongated frame member in either of two opposite longitudinal directions, thereby enabling the bracket to be mounted with the axle tube orifice spaced either forward or rearward with respect to the frame coupling.

2. The elongated frame member and bracket of claim 1 in which the frame coupling is yoke-shaped, having two spaced apart coupling ears so that the elongated frame member can be positioned between the coupling ears, wherein the coupling ears have generally flat inner surfaces to substantially conform with corresponding generally flat surfaces on the elongated frame member, and further comprising a connector for linking the ears to attach the frame coupling to the elongated frame member.

3. The wheelchair of claim 1 in which the extension extends away from the frame coupling at an angle to a line normal to the elongated frame member, the angle being within the range of from about 10 to about 60 degrees.

4. The wheelchair of claim 1 in which the extension has a generally rounded distal end, and has a flat edge on a side oriented longitudinally away from the frame coupling.

5. A wheelchair comprising:

side frames for supporting a seat, the side frames including an elongated frame member which is generally horizontal;

drive wheels and caster wheels on which the side frames are mounted; and a bracket mounted for movement along the elongated wheelchair frame member, the bracket having a frame coupling attached to the elongated frame member, and the bracket having an extension extending away from the frame coupling, the extension having an orifice for receiving a wheelchair axle, the orifice being spaced apart from the frame coupling in a direction longitudinally along the wheelchair frame member;

wherein the axle bracket is configured so that it can be attached to the elongated frame member in either of two opposite longitudinal directions, thereby enabling the bracket to be mounted with the axle tube spaced either forward or rearward with respect to the frame coupling.

6. The wheelchair of claim 5, in which the axle bracket is configured so that it can be attached to the elongated frame member in either of two opposite orientations, thereby enabling the bracket to be mounted with the axle tube orifice positioned on either one side or the other of the elongated frame member.

7. The wheelchair of claim 5 in which the frame coupling is yoke-shaped, having two spaced apart coupling ears so that the elongated frame member can be positioned between the coupling ears, wherein the coupling ears have generally flat inner surfaces to substantially conform with corresponding generally flat surfaces on the elongated frame member, and further comprising a connector for linking the ears to attach the frame coupling to the elongated frame member.

8. The wheelchair of claim 5 configured so that the bracket can be attached to the elongated frame member in either of two opposite orientations, thereby enabling the bracket to be mounted with the axle tube orifice positioned on either one side or the other of the elongated frame member.

9. The wheelchair of claim 5 in which the frame coupling is yoke-shaped, having two spaced apart coupling ears so that the elongated frame member can be positioned between the coupling ears, and further comprising a connector for linking the ears to attach the frame coupling to the elongated frame member.

10. The wheelchair of claim 9 in which the coupling ears have generally flat inner surfaces to substantially conform with corresponding generally flat surfaces on the elongated frame member.

11. The wheelchair of claim 9 in which the extension extends away from the frame coupling in a plane substantially midway between the coupling ears.

12. The wheelchair of claim 9 in which the extension extends away from the frame coupling in a plane laterally offset from a plane substantially midway between the coupling ears.

13. The wheelchair of claim 5 in which the orifice is longitudinally spaced apart from the frame coupling by a distance within the range of from about 1 cm to about 10 cm.

14. A wheelchair comprising:

side frames for supporting a seat, the side frames including an elongated generally horizontal frame member;

drive wheels and caster wheels on which the side frames are mounted; and a bracket slidably mounted on the elongated wheelchair frame member, the bracket having a frame coupling attached to the elongated frame member, and the bracket having an extension extending away from the frame coupling, the extension having an orifice for receiving a wheelchair axle, the orifice being spaced apart from the frame coupling in a direction longitudinally along the wheelchair frame member; wherein the axle bracket is configured so that it can be attached to the elongated frame member in either of two opposite longitudinal directions, thereby enabling the bracket to be mounted with the axle tube spaced either forward or rearward with respect to the frame coupling; and wherein the axle bracket is configured so that it can be attached to the elongated frame member in either of two opposite orientations, thereby enabling the bracket to be mounted with the axle tube orifice positioned on either one side or the other of the elongated frame member; and wherein the frame coupling is yoke-shaped, having two spaced apart coupling ears so that the elongated frame member can be positioned between the coupling ears, wherein the coupling ears have generally flat inner surfaces to substantially conform with corresponding generally flat surfaces on the elongated frame member, and wherein a connector links the ears to attach the frame coupling to the elongated frame member.

* * * * *